(12) United States Patent
Worley et al.

(10) Patent No.: US 11,420,512 B2
(45) Date of Patent: *Aug. 23, 2022

(54) INTEGRATED TRANSMISSION WITH CVP AND POWER ELECTRONICS APPARATUS

(71) Applicant: Deere & Company, Moline, IL (US)

(72) Inventors: Stacy K. Worley, Coffeyville, KS (US); Ronald D. Bremner, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 262 days.

This patent is subject to a terminal disclaimer.

(21) Appl. No.: 16/707,453

(22) Filed: Dec. 9, 2019

(65) Prior Publication Data

US 2021/0170857 A1   Jun. 10, 2021

(51) Int. Cl.
*B60K 6/543* (2007.10)
*B60K 23/00* (2006.01)
(Continued)

(52) U.S. Cl.
CPC .............. *B60K 6/543* (2013.01); *B60K 6/405* (2013.01); *B60K 17/06* (2013.01); *B60K 23/00* (2013.01);
(Continued)

(58) Field of Classification Search
None
See application file for complete search history.

(56) References Cited

U.S. PATENT DOCUMENTS 5,156,577 A * 10/1992 Fredriksen .............. F16H 47/04
475/74
7,308,960 B2   12/2007 Shimizu et al.
(Continued)

FOREIGN PATENT DOCUMENTS

CN       108204432 A  *  6/2018  ............... B60K 6/38
DE     102013204766 A1    9/2014
(Continued)

OTHER PUBLICATIONS

Deere & Company, Utility U.S. Appl. No. 16/555,913 filed with the USPTO on Aug. 29, 2019.
(Continued)

*Primary Examiner* — Dirk Wright
(74) *Attorney, Agent, or Firm* — Klintworth & Rozenblat IP LLP

(57) ABSTRACT

An integrated transmission includes a transmission housing having a first housing face through which the input shaft extends; a CVP housed within the housing; and a transmission assembly. The transmission assembly includes an input arrangement contained within the housing and having at least one input transmission component selectively coupling the engine power and the CVP power; a variator arrangement contained within the housing, configured to receive the engine and CVP power and to selectively transfer the engine power, CVP power, and a summing of engine and CVP power as variator output power; and a transmission gear arrangement contained within the transmission housing engaged with the variator arrangement and configured to provide a selective gear reduction for transmission to an output shaft that extends out of the transmission housing. The integrated transmission includes a power electronics apparatus arranged within or on the transmission housing and electrically coupled to the CVP.

20 Claims, 8 Drawing Sheets

(51) Int. Cl.
    *B60K 6/405*    (2007.10)
    *B60K 17/06*    (2006.01)
    *B60W 20/40*    (2016.01)
    *F16H 3/091*    (2006.01)
    *F16H 57/02*    (2012.01)

(52) U.S. Cl.
    CPC ............ *B60W 20/40* (2013.01); *F16H 3/091* (2013.01); *F16H 57/02* (2013.01); *B60Y 2200/92* (2013.01); *B60Y 2300/78* (2013.01); *F16H 2057/02034* (2013.01); *F16H 2057/02043* (2013.01); *F16H 2200/2007* (2013.01)

(56) References Cited

U.S. PATENT DOCUMENTS

| | | | |
|---|---|---|---|
| 9,030,063 B2 | 5/2015 | Rawlinson et al. | |
| 10,119,598 B2* | 11/2018 | Rekow | B60W 30/18063 |
| 10,619,711 B2* | 4/2020 | Fliearman | F16H 3/728 |
| 10,647,193 B2* | 5/2020 | McKinzie | F16H 3/728 |
| 10,670,124 B2* | 6/2020 | Rekow | F16H 61/66 |
| 11,091,018 B2* | 8/2021 | Ore | F16H 3/728 |
| 11,137,052 B2* | 10/2021 | Ore | F16H 3/728 |
| 2005/0211490 A1 | 9/2005 | Shimizu et al. | |

FOREIGN PATENT DOCUMENTS

| | | |
|---|---|---|
| DE | 112009000051 B4 | 1/2016 |
| DE | 112009000022 B4 | 9/2017 |

OTHER PUBLICATIONS

German Search Report issued in application No. DE102020215219.5 dated Jul. 29, 2021 (10 pages).

* cited by examiner

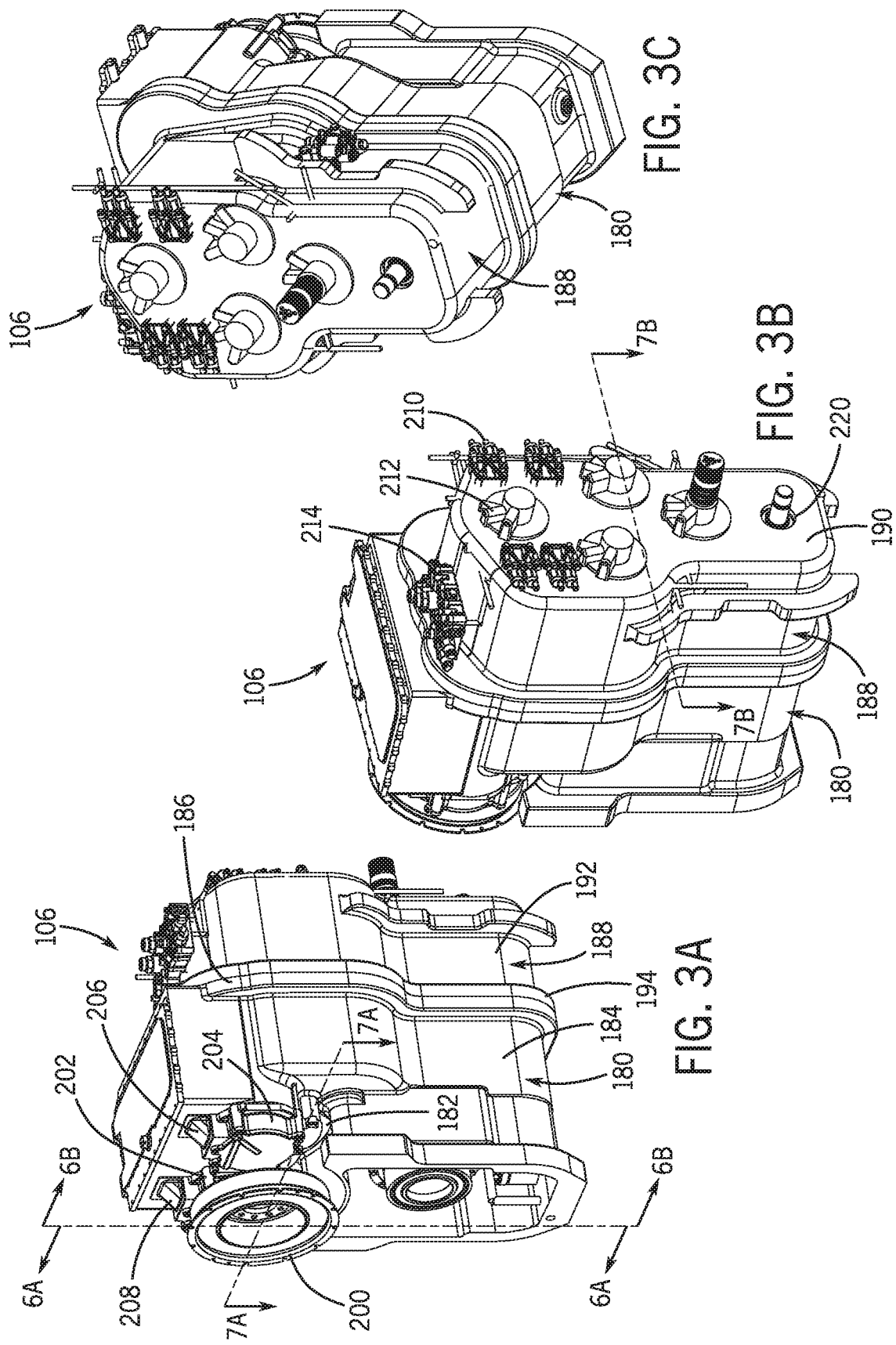

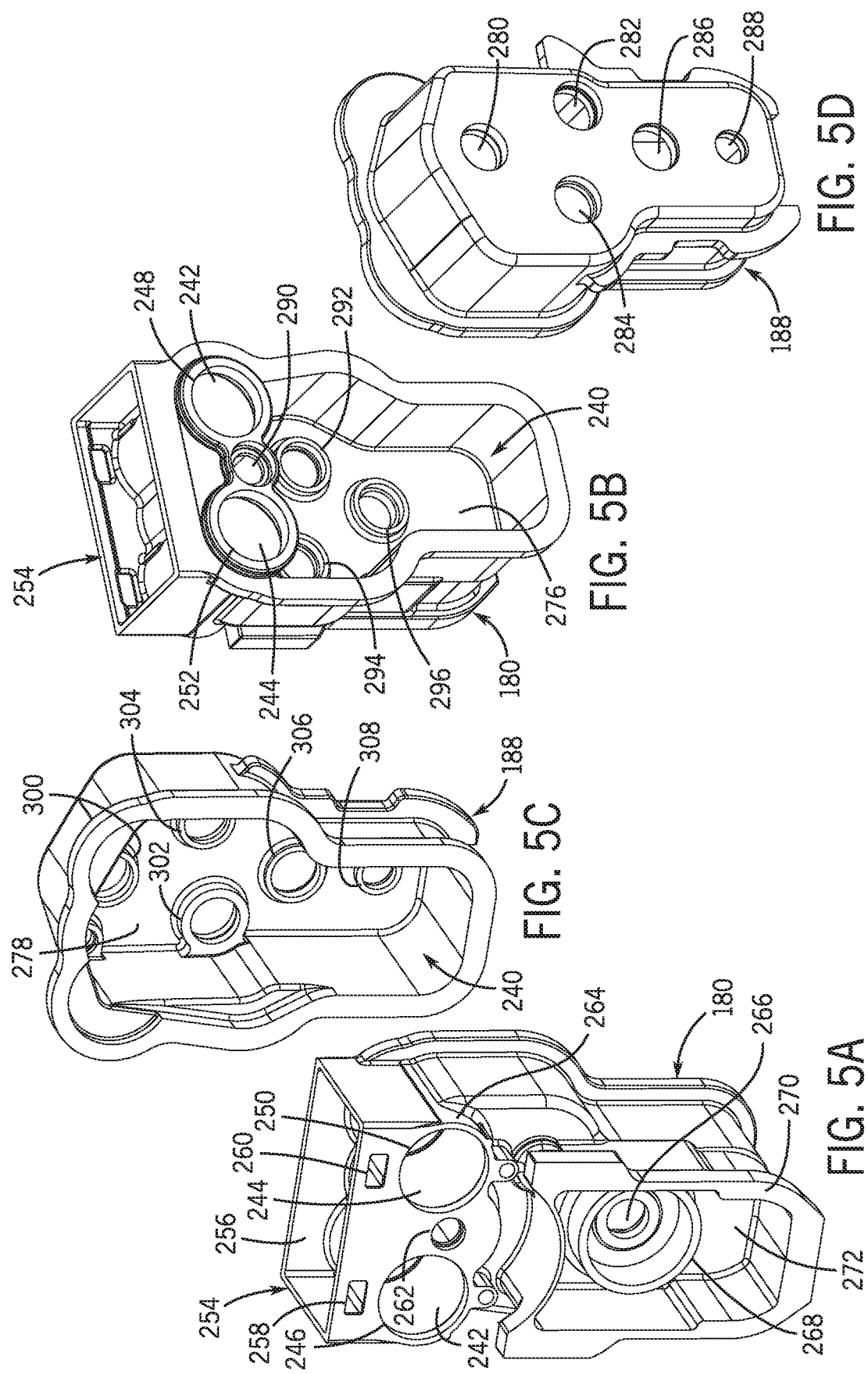

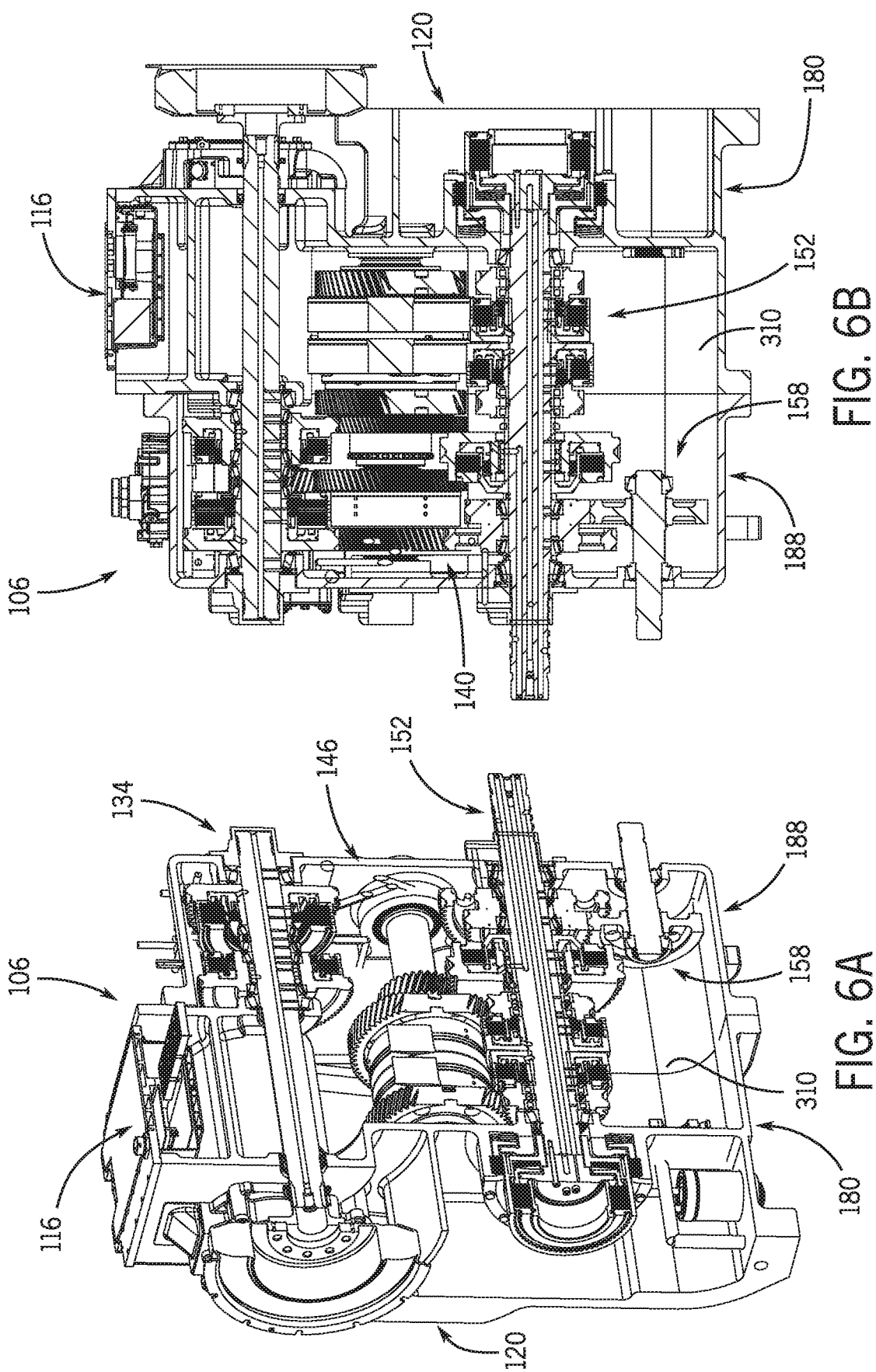

INTEGRATED TRANSMISSION WITH CVP AND POWER ELECTRONICS APPARATUS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to integrated transmissions for powertrains, including multi-mode transmissions for the operation of work vehicles in agricultural, forestry, construction, and other applications.

BACKGROUND OF THE DISCLOSURE

It may be useful, in a variety of settings, to utilize both a traditional engine (e.g., an internal combustion engine) and at least one continuously variable power source (CVP) (e.g., an electric motor/generator or hydraulic motor/pump, and so on) to provide useful power to an output member. For example, a portion of engine power may be diverted to drive a first CVP, which with the assistance of a power electronics apparatus, may in turn drive a second CVP. Power from the engine and/or the second CVP may be delivered to the output member (e.g., a vehicle axle or other output shaft). The engine, the CVPs, and the output member may be operatively connected via a continuously (or infinitely) variable transmission (CVT or IVT). Accordingly, such powertrains include the engine, the CVT, the CVPs, and power electronics apparatus that are individually and collectively arranged on the work vehicle.

SUMMARY OF THE DISCLOSURE

In one example, an integrated transmission is provided for a work vehicle powertrain having an engine delivering engine power to an input shaft. The integrated transmission includes a transmission housing having a first housing face through which the input shaft extends; a continuously variable power source (CVP) housed within the transmission housing and configured to generate CVP power; and a transmission assembly. The transmission assembly further includes an input arrangement contained within the transmission housing and having at least one input transmission component selectively coupling the engine power from the input shaft and the CVP power from the CVP; a variator arrangement contained within the transmission housing, configured to receive the engine power and the CVP power through the input arrangement and to selectively transfer the engine power, transfer the CVP power, and transfer a summing of the engine power and the CVP power as variator output power; and a transmission gear arrangement contained within the transmission housing engaged with the variator arrangement and configured to provide a selective gear reduction for transmission of transmission output power from the variator output power to an output shaft that extends out of the transmission housing. The integrated transmission further includes a power electronics apparatus arranged within or on the transmission housing and electrically coupled to the CVP.

In a further example, an integrated transmission housing is provided for a transmission with a continuously variable power source (CVP) configured to generate CVP power and a transmission assembly that receives engine power via an input shaft. the integrated transmission housing including a first housing shell portion with a first face, a first side wall, and a first shell portion flange circumscribing the first side wall; at least one CVP cylinder arranged within the first housing shell portion configured to house the CVP; and a second housing shell portion with a second face, a second side wall, and a second shell portion flange circumscribing the second side wall. The first shell portion flange and the second shell portion flange are mated together such that at least a portion of the first face, the first side wall, the second face, and the second side wall collectively form a primary housing section configured to house the transmission assembly with an input arrangement selectively coupling the engine power from the input shaft and the CVP power from the CVP, a variator arrangement configured to receive the engine power and the CVP power through the input arrangement and to selectively transfer the engine power, transfer the CVP power, and transfer a summing of the engine power and the CVP power as variator output power, and a transmission gear arrangement engaged with the variator arrangement and configured to provide a selective gear reduction for transmission of transmission output power from the variator output power to an output shaft that extends out of the integrated transmission housing.

The details of one or more implementations are set forth in the accompanying drawings and the description below. Other features and advantages will become apparent from the description, the drawings, and the claims.

BRIEF DESCRIPTION OF THE DRAWINGS

FIGS. 3A-3C are external isometric views of the integrated transmission of FIG. 2 according to an example embodiment of the present disclosure;

FIGS. 5A-5D are isometric views of housing shell portions of the integrated transmission of FIG. 2 according to an example embodiment of the present disclosure;

FIGS. 6A and 6B are cross-sectional views of the integrated transmission through lines 6A-6A and 6B-6B, respectively, of FIG. 5A according to an example embodiment of the present disclosure;

Like reference symbols in the various drawings indicate like elements.

DETAILED DESCRIPTION

Figure 1:
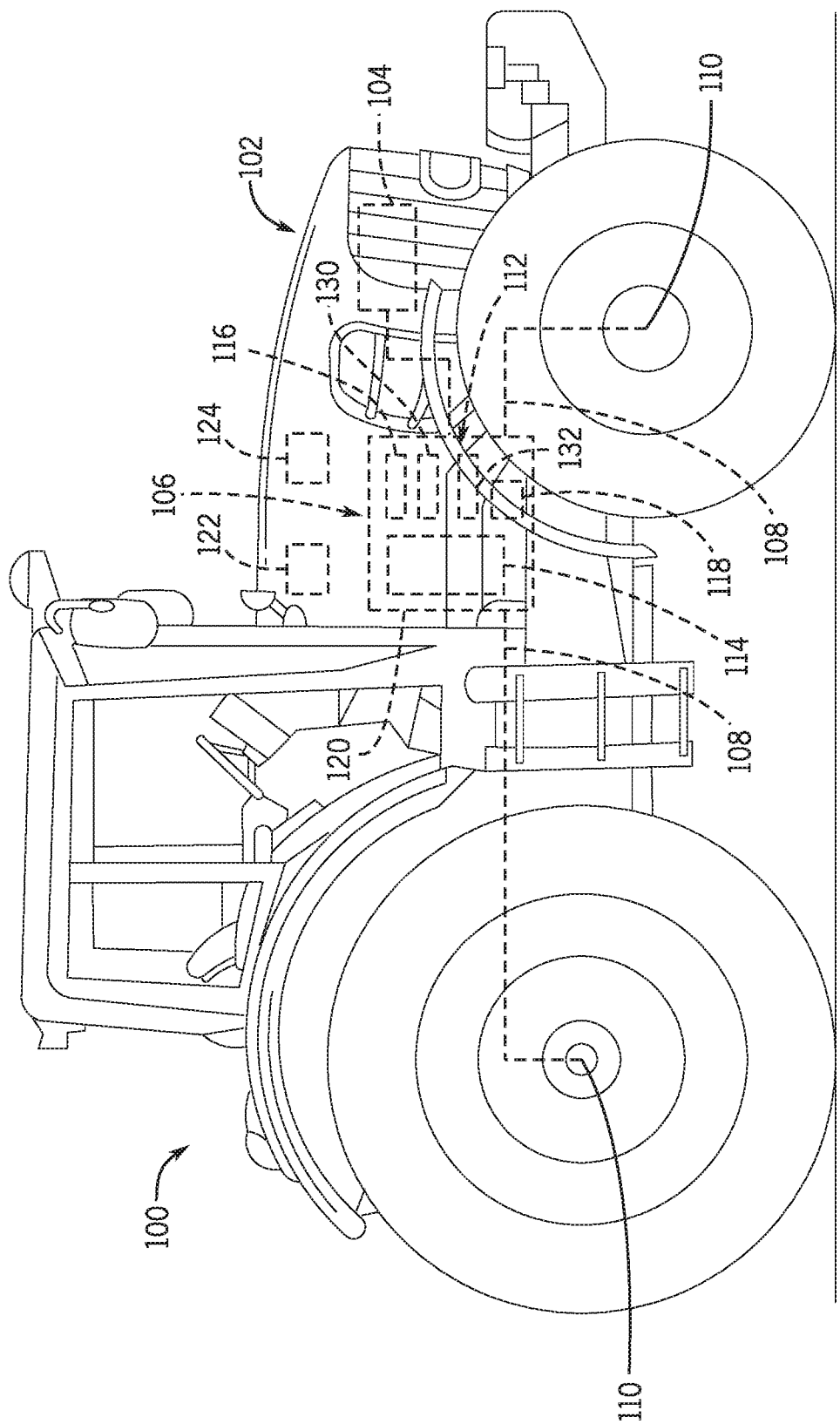
FIG. 1 is a side view of a work vehicle according to an example embodiment of the present disclosure.

The following describes one or more example embodiments of the disclosed integrated transmission, powertrain, and/or vehicle, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

In detailing the disclosure, terms of direction and orientation, such as "forward," "front," "aft," "rear," "lateral," "horizontal," and "vertical" may be used. Such terms are defined, at least in part, with respect to the direction in which the work vehicle or implement travels during use. For example, the terms "forward" and "front" (including "fore" and any further derivatives or variations) refer to a direction corresponding to the primary direction of travel, while the term "aft" and "rear" (and derivatives and variations) refer to an opposing direction. The term "longitudinal axis" may also reference an axis extending in forward and aft directions. By comparison, the term "lateral axis" may refer to an axis that is perpendicular to the longitudinal axis and extends in a horizontal plane; that is, a plane containing both the longitudinal and lateral axes. The term "vertical," as appearing herein, refers to an axis or a direction orthogonal to the horizontal plane containing the longitudinal and lateral axes. Generally, however, these terms may be considered relative to one another such that the respective components or characteristics may be reversed or reoriented and still fall within the scope of the present disclosure.

In the discussion below, various example configurations of shafts, gears, and other power transmission elements are described. It will be understood that various alternative configurations may be possible within the spirit of this disclosure. Further, references to a "continuously" variable transmission, powertrain, or power source will be understood to also encompass, in various embodiments, configurations including an "infinitely" variable transmission, powertrain, or power source.

As used herein, "direct" or "directly" may be used to indicate power transmission between two system elements without an intervening conversion of the power to another form. For example, power may be considered as "directly" transmitted by an engine to an output component if the power is transferred via a number of shafts, clutches, and gears (e.g., various spur, bevel, summing or other gears) without being converted to a different form by a CVP (e.g., without being converted to electrical or hydraulic power by an electrical generator or a hydraulic pump). In contrast, power may not be considered as "directly" transmitted between two system elements if a substantive portion of the power is converted to another form during transmission. For example, power may not be considered as "directly" transmitted between an engine and an output component if a portion of the engine's power is converted to a different form by a CVP, even if that portion is later reconverted to rotational power (e.g., by another CVP) and then recombined with the unconverted engine power (e.g., by a summing planetary gear or other summing assembly). Also as used herein, "between" may be used with reference to a particular sequence or order of power transmission elements, rather than with regard to physical orientation or placement of the elements. For example, a clutch device may be considered as being "between" an engine and an output component if power is routed to the output component via the clutch device, whether or not the engine and the output component are on physically opposite sides of the clutch device.

The continuously variable transmission (CVT) may be integrated into the transmission of the present disclosure may provide a plurality of different modes with set of transmission elements. For example, a "split-path" power transmission mode may be provided in which power from both the engine and a CVP is combined for delivery of useful power to the output member. In additional embodiments, useful power may be provided by a CVP but not by the engine (except to the extent the engine drives the CVP) in a "CVP-only" power transmission or series mode. Finally, in some embodiments, useful power may be provided by the engine (e.g., via various mechanical transmission elements, such as shafts and gears), but not by a CVP, in a "mechanical-path" mode. The integrated transmission of the present disclosure may also provide these modes according to different output speed ranges and directions.

Accordingly, in one example, an integrated transmission includes a transmission housing with a forward housing shell portion and an aft housing shell portion that collectively form a primary housing section that houses the transmission assembly forming the CVT. The forward housing shell portion further includes one or more CVP cylinders to house the CVP within the housing. In particular, the CVP cylinders may include a first CVM cylinder that houses the first CVM configured to be driven by the engine power to operate as a generator to produce electric power and a second CVM cylinder to be driven by the electric power, via the power electronics apparatus, to operate as a motor to produce the CVP power to drive the transmission assembly. In some embodiments, the first housing shell further includes a power electronics apparatus wall that at least partially defines an electronics housing section that houses the power electronics apparatus. Although one embodiment includes the transmission housing with two shell portions, other embodiments may have a single transmission housing. As a result, the transmission may be an integrated arrangement with the CVP, transmission assembly, and power electronics arranged on or within a single housing.

The transmission of the present disclosure may provide various advantages, including the integration of the CVP within the transmission housing. For example, the transmission is configured such that the machines of the CVP may be parallel to and axially overlap the other shafts and components within the transmission housing. This configuration provides a relatively smaller footprint for the transmission and CVP with a shorter length while enabling multiple operational modes, thereby allowing use of the transmission across a number of platforms.

As will become apparent from the discussion herein, the disclosed integrated transmission may be used advantageously in a variety of settings and with a variety of machinery. For example, referring now to FIG. 1, an example work vehicle 100 is depicted as a tractor. It will be understood, however, that other configurations may be possible, including configurations with the vehicle 100 as a different kind of tractor, a harvester, a log skidder, a grader, or one of various other work vehicle types. It will further be understood that the disclosed powertrains may also be used in non-work vehicles and non-vehicle applications (e.g., fixed-location power installations).

Generally, the work vehicle 100 includes a powertrain 102 configured to generate and distribute power from one or more power sources to various power sinks of the vehicle 100. In one example, broadly, the powertrain 102 may include an engine 104, a transmission 106, a driveline 108, and rear and/or front axles 110. The transmission 106 may include a continuously variable power source (CVP) 112, a transmission assembly 114, a power electronics apparatus 116, and in some examples, a pump drive 118, portions or all of which may be housed within a housing 120, as described in greater detail below. As such, the powertrain 102 generates and distributes power from the engine 104 and the CVP 112, via the transmission assembly 114 and the power electronics apparatus 116, to the driveline 108, and subsequently, to the rear and/or front axles 110. The powertrain 102 may be additionally or alternatively configured for delivering power to a power take-off shaft (not shown in FIG. 1) for powering an implement that is supported on the vehicle 100 or that is supported on a separate vehicle. It will be appreciated that the powertrain 102 may be configured for delivering power to other power sinks without departing from the scope of the present disclosure.

Regarding the power sources of the powertrain 102, the engine 104 may be an internal combustion engine of various known configurations. In one embodiment, the CVP 112 may include at least one continuously variable machine (CVM), such as an electrical machine or a hydraulic machine. In one embodiment, the CVP 112 includes a first CVM that operates as a generator and a second CVM that operates as a motor.

As discussed in greater detail below, the transmission assembly 114 may include various gears, clutches, shafts, and other power transfer elements that operate as a continuously (or infinitely) variable transmission assembly according to various modes for selectively distributing power between the engine 104 and the CVP 112, power from the engine 104 to the power sinks (e.g., the driveline 108 and axles 110), power from the CVP 112 to the power sinks, and combined power from the engine 104 and the CVP 112 to the power sinks.

The power electronics apparatus 116 may be positioned within or on the housing 120 of the transmission 106 and may operate in any suitable manner to support operation of the powertrain 102 and other aspects of the vehicle 100. In one example, the power electronics apparatus 116 includes one or more inverters that convert DC power (e.g., from the first CVM 130) into AC power (e.g., for the second CVM 132). The inverters of the power electronics apparatus 116 may include power semiconductor switches with insulated-gate bipolar transistors (IGBTs) formed by materials such as silicon carbide (SiC) and gallium nitride (GaN). As described in greater detail below, the power electronics apparatus 116 formed by these materials may operate at relatively higher temperatures as compared to other, more conventional materials, thereby enabling additional integration and/or common cooling with the transmission assembly 114 and CVP 112 within or proximate to the housing 120. In one embodiment, the pump drive 118 is arranged within or on the housing 120 to be driven by the engine 104 or CVP 112 to distribute hydraulic fluids to the various systems of the vehicle 100. Although depicted as part of the transmission 106 in FIG. 1, in some embodiments, the pump drive 118 may be positioned separate from the transmission 106 (or omitted).

Additional details regarding the transmission 106, particularly the housing 120 and the transmission configuration within the housing 120, are provided in greater detail below.

In some examples, the vehicle 100 may further include a human-machine (or operator) interface 122 and a controller 124. The controller 124 may control one or more aspects of the operation of the work vehicle 100 based on inputs from the operator interface 122, and in some embodiments, facilitate implementation and operation of the powertrain 102. The operator interface 122 may be disposed inside a cab of the work vehicle 100 for easy access by the vehicle operator. The operator interface 122 may be configured in a variety of ways, including an input device with one or more joysticks, various switches or levers, one or more buttons, a touch-screen interface that may be overlaid on a display, a keyboard, a speaker, a microphone associated with a speech recognition system, or various other human-machine interface devices. As an example, the operator may utilize the operator interface 122 and controller 124 to select and implement a selected mode of operation of the transmission 106.

In one example, the controller 124 may be configured as one or more computing devices with associated processor devices and memory architectures, as a hard-wired computing circuit (or circuits), as a programmable circuit, as a hydraulic, electrical or electro-hydraulic controller, or otherwise; and the controller 124 may be configured to execute various computational and control functionality with respect to the work vehicle 100 (or other machinery). In some embodiments, the controller 124 may be configured to receive input signals in various formats (e.g., as hydraulic signals, voltage signals, current signals, and so on), and to output command signals in various formats (e.g., as hydraulic signals, voltage signals, current signals, mechanical movements, and so on).

Figure 2:
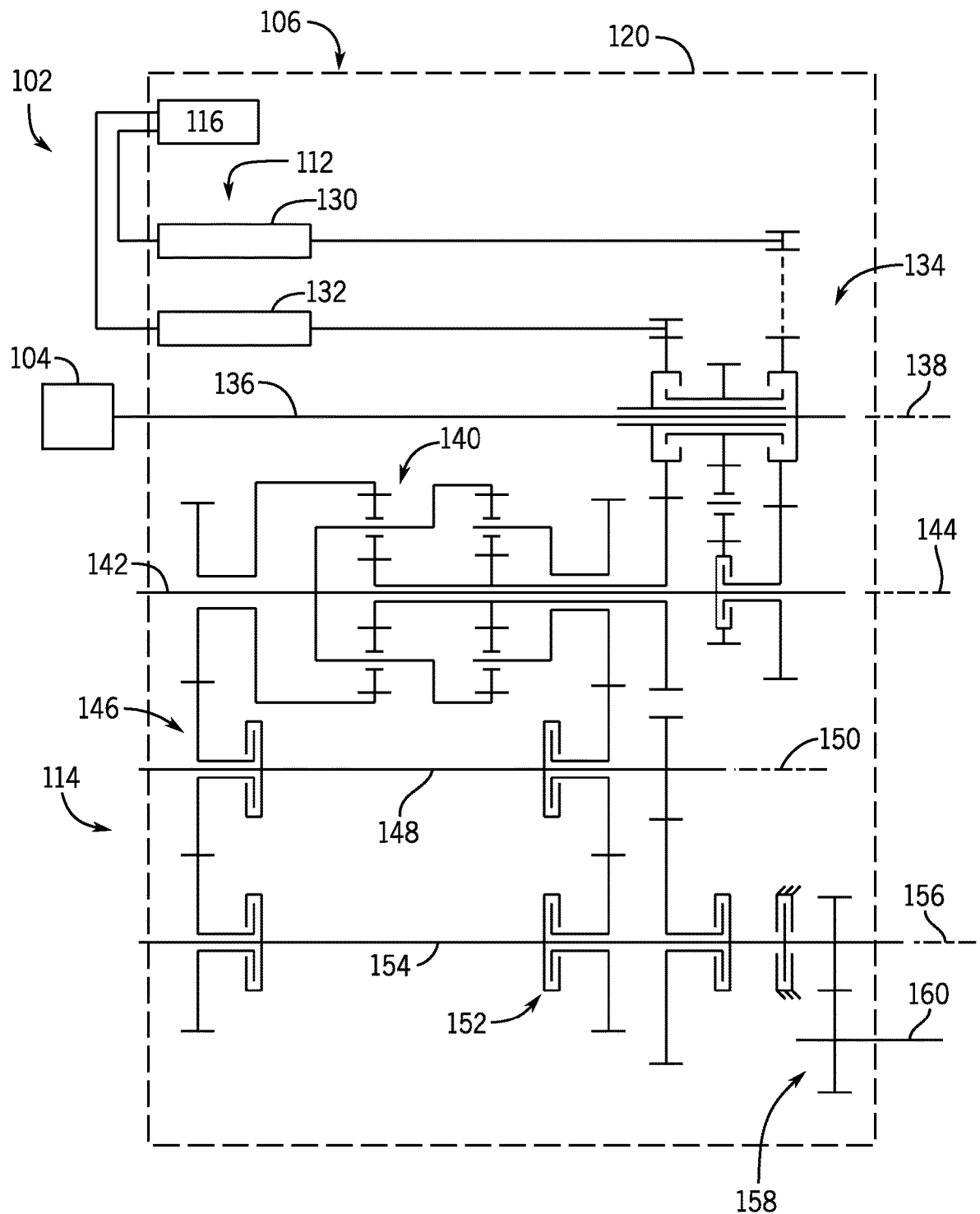
FIG. 2 is a schematic view of a powertrain with an integrated transmission according to an example embodiment of the present disclosure.

Referring now to FIG. 2, an example configuration of the powertrain 102 is depicted schematically. As introduced above, the powertrain 102 may include the engine 104 and the transmission 106 with the housing 120 that at least partially houses the CVP 112, the transmission assembly 114, the power electronics apparatus 116, and in some examples, the pump drive 118 (not shown in FIG. 2). As also introduced above, the CVP 112 may include at least one continuously variable machine (CVM), such as an electrical machine or a hydraulic machine, including the first CVM 130 and the second CVM 132. The first CVM 130 may be operably connected to the second CVM 132 via the power electronics apparatus 116 and/or other suitable conduits or elements.

Generally, the transmission assembly 114 includes a plurality of components, such as shafts, gears, gear sets, clutches, brakes, and/or other components, that interconnect to enable the transfer power between the engine 104, the first CVM 130, and/or the second CVM 132 to appropriately power one or more other output members (e.g., one or both axles 110) of the vehicle 100 (FIG. 1). The transmission assembly 114 may be considered a continuously (or infinitely) variable transmission assembly or an infinitely variable transmission assembly. Also, the transmission 106 may be configured to provide selection between one of the plurality of transmission modes in which the transmission assembly 114 selectively transmits power from the engine 104 and/or the CVP 112 to the output members.

In some embodiments, the first CVM 130 and the second CVM 132 are both electrical machines. Also, in some embodiments, the first and/or second CVMs 130, 132 may be configured to operate as a motor (to output mechanical power from electrical input power) and as a generator (to output electrical power from mechanical input power). As such, in addition to providing rotational power to one or more output members, as discussed below, the engine 104 may also provide rotational power to the first CVM 130 via the transmission assembly 114. Continuing, the first CVM 130 may convert the received power to an alternate form (e.g., electrical or hydraulic power) for transmission. In one example, the power from the first CVM 130 is electrical power that is conditioned by the power electronics apparatus 116. This converted and transmitted power may be received by the second CVM 132 from the power electronics apparatus 116 and then reconverted by the second CVM 132 to provide a rotational power output to the transmission assembly 114.

In an example configuration, the transmission assembly 114 may include an input arrangement 134 with an input shaft 136 defining an input axis 138. The input arrangement 134 may be substantially centered with respect to the input axis 138. The input axis 138 may represent an axis of rotation for at least a portion of the input arrangement 134. Accordingly, the input arrangement 134 may include at least one input component (e.g., gears, clutches, bearings, shafts, and the like) that is supported for rotation about the input axis 138 and/or other portions of the transmission assembly 114. The engine 104 and the CVP 112 are operatively connected to drive the input arrangement 134.

The transmission assembly 114 may also include a variator arrangement 140 with at least one variator shaft 142 defining an associated variator axis 144. The variator arrangement 140 may be substantially centered with respect to the variator axis 144. The variator arrangement 140 may include at least one variator component, discussed below, that is supported for rotation about the variator axis 144. The variator arrangement 140 is operably connected to the engine 104 and the CVP 112 via the input arrangement 134. Generally, the variator arrangement 140 and/or input arrangement 134 may include a variety of devices capable of summing the mechanical inputs from the engine 104 and the CVP 112 for a combined mechanical output to the output shaft 154 for split-path power transmission. As such, the variator arrangement 140 is configured to receive engine power and the CVP power through the input arrangement 134 and to selectively transfer the engine power, transfer the CVP power, and/or transfer a summing of the engine power and the CVP power as variator output power. In certain embodiments, as depicted in FIG. 2, the variator arrangement 140 may be configured with a summing planetary gear set group (e.g., a double planetary gear set group with one or more sun gears, planetary gears, ring gears, and carriers). It will be understood, however, that other configurations may be possible.

The transmission assembly 114 may further include a countershaft arrangement 146 with a countershaft 148 defining a countershaft axis 150. The countershaft arrangement 146 may be substantially centered with respect to the countershaft axis 150. The countershaft axis 150 may represent an axis of rotation for the countershaft arrangement 146. Accordingly, the countershaft arrangement 146 may include at least one countershaft component (e.g., gears, clutches, bearings, shafts, and the like) that is supported for rotation about the countershaft axis 150. The countershaft arrangement 146 may be configured for changing rotational direction of the power delivered from the variator arrangement 140 (e.g., as variator output power).

Furthermore, the transmission assembly 114 may include an output arrangement 152 at least partially formed by an output shaft 154 defining an output axis 156. The output arrangement 152 may be substantially centered with respect to the output axis 156. The output axis 156 may represent an axis of rotation for the output arrangement 152. Accordingly, the output arrangement 152 may include at least one output component (e.g., gears, clutches, bearings, shafts, and the like) that is supported for rotation about the output axis 156. As such, the output arrangement 152 may deliver power from the countershaft arrangement 146 to the output shaft 154. In effect, the components associated and/or forming the countershaft arrangement 146 and the output arrangement 152 (e.g., "range" clutches and gears) may function as a transmission gear arrangement that provides selective gear reduction for transmission of the variator output power from the variator arrangement 140 to produce transmission output power at the output shaft 154. As noted above, the output shaft 154 may be rotationally coupled to the driveline 108 (FIG. 1).

An additional power output of the transmission assembly 114 may be a power take-off ("PTO") arrangement 158 with one or more PTO shafts 160. The PTO arrangement 158 engages the output shaft 154 such that the output shaft 154 may drive the PTO shaft 160.

Accordingly, the variator arrangement 140 may be disposed between and operatively connected to the input arrangement 134 and the countershaft arrangement 146, and the countershaft arrangement 146 may be disposed between and operatively connected to the variator arrangement 140 and the output arrangement 152. As such, the transmission 106 may be configured for power flow along a path from the input arrangement 134, through the variator arrangement 140 and the countershaft arrangement 146, and to the output arrangement 152 and/or PTO arrangement 158.

As shown in FIG. 2, the transmission 106 may include a set of selective transmission components for selecting between the different transmission modes. The selective transmission components may include wet clutches, dry clutches, dog collar clutches, brakes, or other similar components that may selectively move between an engaged position and a disengaged position. The transmission assembly 114 further includes a number of gears and hollow shafts that transfer power. In one example, the transmission assembly 114 includes a number of clutches, including one or more forward clutches, reverse clutches, "creeper" clutches, drive clutches, and range clutches. These clutches are selectively controlled by a controller 124 (FIG. 1) to appropriately distribute power from and between the engine 104, CVP 112, and/or transmission assembly 114 to modify the direction and/or speed of power flow to the output shaft 154 and PTO shaft 160.

The transmission assembly 114 may be configured as a multi-mode transmission and may provide selective shifting between the different modes. For example, the transmission 106 may provide one or more split-path power transmission modes. In each of these modes, power from the engine 104 and the CVP 112 may be combined or summed (e.g., by the variator arrangement 140), and the resulting combined or summed power may be delivered to the output shaft 154 and/or PTO shaft 160 at one or more speeds and directions. Additionally, the transmission assembly 114 may provide one or more CVP-only modes to disconnect the engine 104 from the output shaft 154 and instead deliver only CVP power from the CVP 112 to the output shaft 154 and/or PTO shaft 160 at one or more speeds and directions. Additionally, the transmission assembly 114 may provide one or more engine-only modes in which power from only the engine 104 is delivered to the output shaft 154 and/or PTO shaft 160 at one or more speeds and directions.

As introduced above, portions of the transmission 106 are housed in the transmission housing 120 that is schematically depicted in FIG. 2. The housing 120 at least partially encloses the transmission assembly 114 and the CVMs 130, 132 and houses or supports the power electronics apparatus 116, and optionally, the pump drive 118.

One example implementation of the transmission 106 is represented in the views of FIGS. 3A-7D. In particular, FIGS. 3A, 3B, and 3C provide external isometric views of the transmission 106, particularly external to the transmission housing 120. The view of FIG. 3A may be considered a forward side top view; FIG. 3B may be considered an aft side top view; and FIG. 3C may be considered an aft side bottom view.

Referring to FIGS. 3A-3C, in one example, the housing 120 may be formed by two cooperating shell portions 180, 188, which in the depicted example are a forward (or first) shell portion 180 and an aft (or second) shell portion 188. The forward shell portion 180 defines a forward face 182 and forward side wall 184 with a forward shell portion coupling flange 186 circumscribing the forward side wall 184. Similarly, the aft shell portion 188 defines an aft face 190 and aft side wall 192 with an aft shell portion coupling flange 194 circumscribing the aft side wall 192. The forward shell portion coupling flange 186 and the aft shell portion coupling flange 194 are configured to mate with one another along a generally vertical plane to form the two shell portions 180, 188 of the assembled housing 120, although other configurations may be provided. The forward shell portion coupling flange 186 and the aft shell portion coupling flange 194 may be secured together in any suitable manner, including by fastening mechanism such as bolts.

Again referring to the exterior views, particularly the view of FIG. 3A, a number of elements may be mounted to or otherwise extend through the forward face 182 of the forward shell portion 180. As shown, an input coupler 200 extends through the forward face 182 of the forward shell portion 180 that enables coupling of an engine shaft to the input shaft 136. As further depicted in FIG. 3A, CVP caps 202, 204 and connection caps 206, 208 are provided to at least partially house aspects of the CVP 112, power electronics apparatus 116, and electrical connections between the CVP 112 and power electronics apparatus 116 (FIG. 2).

Referring to the aft exterior views of FIGS. 3B and 3C, outer valve elements 210, end caps 212, and hydraulic control 214 provide access to hydraulic controls for operation of various aspects the transmission assembly 114 (FIG. 2). Further, a PTO shaft aperture 220 is defined in the aft face 190 of the aft shell portion 188 to support and enable access to the PTO shaft 160.

As noted above, the transmission 106 may include a pump drive 118 (FIG. 1) configured to distribute hydraulic fluid throughout the transmission 106 and other vehicle systems. Although not shown in FIGS. 3A-3C, the pump drive 118 (FIG. 1) may be mounted on or within the housing 120.

Figure 4B:
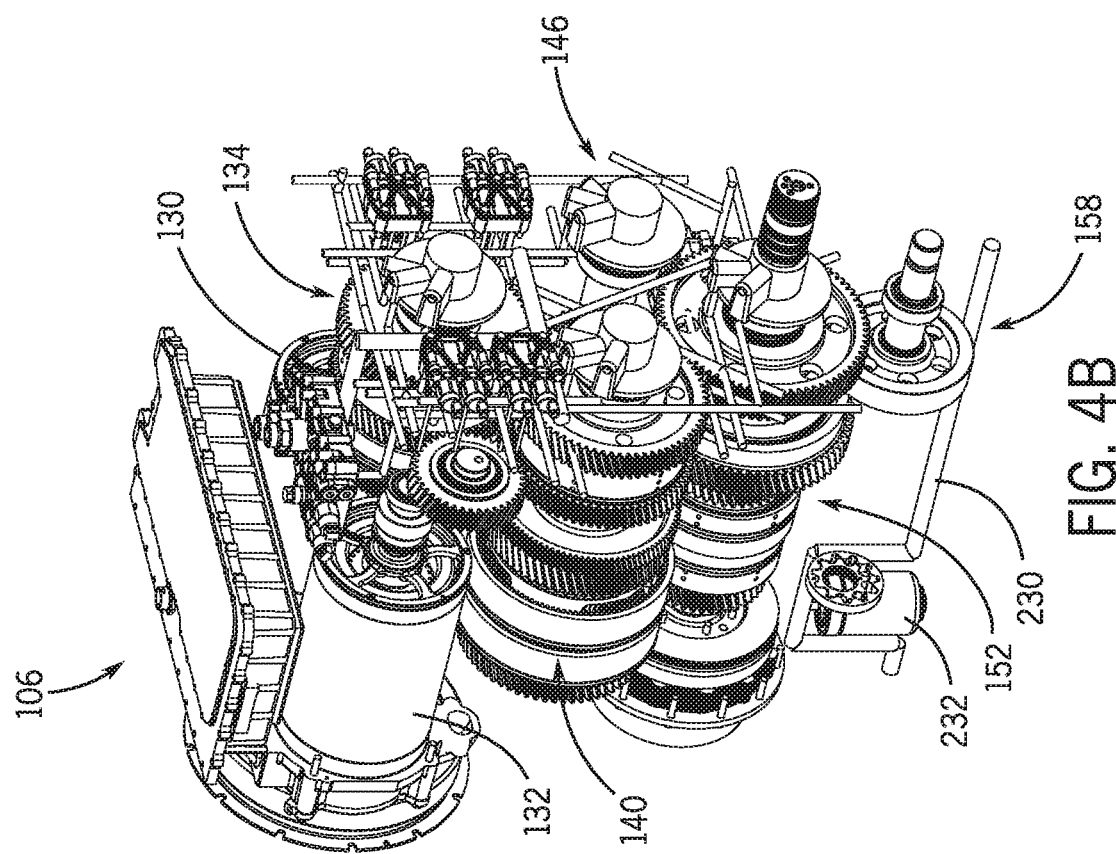
FIGS. 4A and 4B are isometric views of the integrated transmission of FIG. 2 with a housing removed according to an example embodiment of the present disclosure.
Figure 4A:
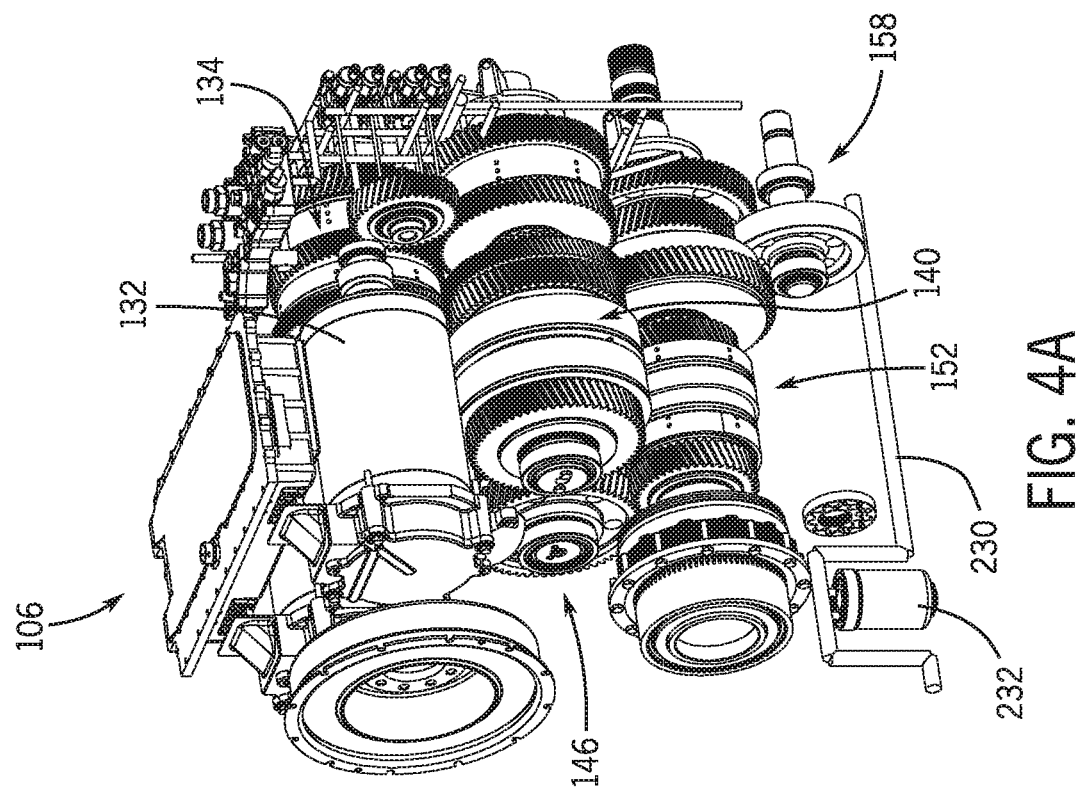

Briefly, reference is made to FIGS. 4A and 4B, which depict views of the arrangement of the internal components of transmission 106 without the housing 120. FIG. 4A is a forward isometric view, and FIG. 4B is an aft isometric view. As introduced schematically above, the transmission 106 includes the CVP 112 with the first CVM 130 and the second CVM 132, the transmission assembly 114, and the power electronics apparatus 116. In this example, the transmission assembly 114 includes the input arrangement 134 with the input shaft 136, the variator arrangement 140 with the variator shaft 142, the countershaft arrangement 146 with the countershaft 148, the output arrangement 152 with the output shaft 154, and the PTO arrangement 158 with the PTO shaft 160. Generally, the input shaft 136 extends from the forward end of the transmission assembly 114, and the input arrangement 134 is positioned for engagement with the variator arrangement 140. Further, the variator arrangement 140 is arranged to engage the countershaft arrangement 146, which in turn, is positioned to engage with the output arrangement 152 that drives the PTO arrangement 158. As such and as described above, the transmission assembly 114 is configured to compactly operate within the housing 120 to provide multiple modes and speeds. As described below, the housing 120 is configured to facilitate operation of the CVP 112, the transmission assembly 114, and the power electronics apparatus 116, individually and collectively.

The views of FIGS. 5A, 5B, 5C, and 5D depict various isometric views of the housing shell portions 180, 188 separated from one another and the other components of the transmission 106. In particular, FIGS. 5A and 5B are exterior (or forward) and interior (or aft) views, respectively, of the forward shell portion 180; and FIGS. 5C and 5D are interior (or forward) and internal exterior (or aft) views, respectively, of the aft shell portion 188.

As noted above, and initially referring to FIGS. 5B and 5C, the housing shell portions 180, 188, when joined, collectively form a primary housing section 240 in which portions of the transmission assembly 114 (FIG. 2) are housed within the interior of each shell portion 180, 188. In other words, sections of the forward face 182 and forward side wall 184 of the forward shell portion 180 and the aft face 190 and aft side wall 192 of the aft shell portion 188 cooperate to form the primary housing section 240. As best shown in FIGS. 5A and 5B, the forward shell portion 180 additionally forms CVP cylinders in the form of a first CVM cylinder 242 and a second CVM cylinder 244. As described in greater detail below, the first CVM cylinder 242 houses the first CVM 130 and the second CVM cylinder 244 houses the second CVM 132. Generally, the first CVM cylinder 242 is partially defined by a first CVM external aperture 246 formed on the forward face 182 and a first CVM internal aperture 248 oriented on the interior of the housing 120; and the second CVM cylinder 244 is partially defined by a second CVM external aperture 250 formed on the forward face 182 and a second CVM internal aperture 252 oriented on the interior of the housing 120. The first CVM cylinder 242 and the second CVM cylinder 244 may, in effect, provide sub-housings for the first and second CVMs 130, 132 relative to the transmission assembly 114 and power electronics apparatus 116. Referring briefly to the FIG. 3A, the caps 202, 204 are positioned to cover the first CVM external aperture 246 and the second CVM external aperture 250.

As also shown by FIGS. 5A and 5B, the forward shell portion 180 further includes an electronics housing section 254 defined by electronics housing walls 256. A first electronics coupling aperture 258 and a second electronics coupling aperture 260 are formed in the forward face 182 of the forward shell portion 180. The electronics housing section 254 may, in effect, provide a sub-housing for the power electronics apparatus 116 relative to the first and second CVMs 130, 132 and the transmission assembly 114. Referring briefly to the FIG. 3A, the caps 202, 204 are positioned to cover the first electronics coupling aperture 258 and a second electronics coupling aperture 260 and the electrical connections between the CVMs 130, 132 and the power electronics apparatus 116.

Referring to FIG. 5A, a forward input aperture 262 is formed in the forward face 182 of the forward shell portion 180. The forward input aperture 262 is positioned in between the first and second CVM external apertures 246, 250 such that the input shaft 136 may extend through the forward shell portion 180 to the transmission assembly 114 housed within the primary housing section 240. In this example, portions of the first and second CVM cylinders 242, 244 and the electronics housing section 254 are accommodated by a forward extending extension 264 formed in the forward face 182 of the forward shell portion 180. Similarly, a forward output aperture 266 is also defined in the forward face 182 of the forward shell portion 180. As described in greater detail below, the forward output aperture 266 may provide access to the output shaft 154 of the transmission assembly 114. A forward exterior output flange 268 circumscribes the forward output aperture 266, and a forward external cavity wall 270 extends from the forward face 182 of the forward shell portion 180 to form a forward external open cavity 272. The forward output aperture 266 and forward exterior output flange 268 are positioned within the forward external open cavity 272 such that the forward external cavity wall 270 may partially house one end of the output shaft 154 (FIG. 2).

Referring additionally to the internal view of the forward shell portion 180 depicted in FIG. 5B, an input shaft cylinder 290 that opens on the forward face 182 at the forward input aperture 262 extends between the CVM cylinders 242, 244 to support the input shaft through the forward shell portion 180 to the other sections of transmission assembly 114. In particular, the input shaft cylinder 290 functions to surround the input shaft 136 (FIG. 2) through this portion of the forward shell portion 180. The view of FIG. 5B also depicts a forward internal face 276 of the forward shell portion 180. As shown, a forward internal countershaft support flange 292, a forward internal variator support flange 294, and a forward internal output support flange 296 extend inwardly from the forward internal face 276. The forward internal countershaft support flange 292, forward internal variator support flange 294, and forward internal output support flange 296 are generally cylindrical structures that function to respectively support the countershaft 148, variator shaft 142, and output shaft 154 of the transmission assembly 114.

Referring now to the aft shell portion 188 in FIGS. 5C and 5D, various apertures 280, 282, 284, 286, 288 may be defined in the aft face 190 to accommodate or otherwise support access to portions of the transmission assembly 114. In this example, the aft face 190 of the aft shell portion 188 includes an aft input aperture 280, aft countershaft aperture 282, aft variator aperture 284, aft output aperture 286, and aft PTO aperture 288. The aft input aperture 280, aft countershaft aperture 282, and aft variator aperture 284 enable at least partial access to the input shaft 136, countershaft 148, and variator shaft 142, respectively. The aft output aperture 286 and aft PTO aperture 288 are positioned to support the output shaft 154 and PTO shaft 160 extending from the transmission assembly 114 in order to drive downstream components.

The view of FIG. 5D depicts the aft internal face 278 of the aft shell portion 188. As shown, an aft internal input support flange 300, an aft internal countershaft support flange 302, an aft internal variator support flange 304, an aft internal output support flange 306, and an aft internal PTO support flange 308 extend inwardly from the aft internal face 278. The aft internal input support flange 300, the aft internal countershaft support flange 302, the aft internal variator support flange 304, the aft internal output support flange 306, and the aft internal PTO support flange 308 are generally cylindrical structures that function to respectively support the input shaft 136, the countershaft 148, the variator shaft 142, the output shaft 154, and the PTO shaft 160.

As demonstrated by the views of FIGS. 5A-5D, particularly in view of FIGS. 4A and 4B, the power electronics apparatus 116, the CVPs 112, and the transmission assembly 114 are arranged within the housing 120 such that the power electronics apparatus 116, the CVPs 112, and the transmission assembly 114 may utilize a single cooling circuit or system. In other words, the coolant may be circulated, via conduits or apertures, within the power electronics apparatus 116, flow across the CVPs 112, through the transmission assembly 114, and collected in a common location, such as a sump 310 (FIG. 6A, 6B), discussed in greater detail below. The coolant may be any suitable fluid, such as water, ethyl glycol, or oil. This common circuit may provide simplicity and cost and space savings with respect to eliminated additional pumps, coils, and hoses.

The views of FIGS. 6A and 6B are generally vertical cross-sectional views of the transmission 106, as respectively referenced by line 6A-6A and line 6B-6B in FIG. 3A, and depict the interaction and relative arrangement of the CVP 112 and transmission assembly 114 within the housing 120 in different lateral directions. For example, FIG. 6A depicts a configuration of the input arrangement 134, countershaft arrangement 146, output arrangement 152, and PTO arrangement 158 within the housing 120. As shown in the view of FIG. 6A, the forward internal countershaft support flange 292 and the forward internal output support flange 296 on the forward shell portion 180 function to respectively support the countershaft 148 and output shaft 154 of the transmission assembly 114. The view of FIG. 6A additionally depicts the aft internal input support flange 300, the aft internal countershaft support flange 302, the aft internal output support flange 306, and the aft internal PTO support flange 308 that function to respectively support the input shaft 136, the countershaft 148, the output shaft 154, and the PTO shaft 160.

The view of FIG. 6B is oriented in the opposite lateral direction from the view of FIG. 6A. As such, the view FIG. 6B depicts the forward internal variator support flange 294 and the forward internal output support flange 296 on the forward shell portion 180 function to respectively support the variator shaft 142 and output shaft 154 of the transmission assembly 114. The view of FIG. 6B additionally depicts the aft internal input support flange 300, the aft internal variator support flange 304, the aft internal output support flange 306, and the aft internal PTO support flange 308 that respectively support the input shaft 136, the variator shaft 142, the output shaft 154, and the PTO shaft 160.

Accordingly, the views of FIGS. 6A and 6B demonstrate that, in this example, the housing 120 is configured such that at least a portion of the CVMs 130, 132 vertically overlap at least a portion of the transmission assembly 114. In other words, portions of the CVMs 130, 132 and portions of the transmission assembly 114, particularly portions of the input arrangement 134, are positioned in a common horizontal plane within the housing 120.

The views of FIGS. 6A and 6B additionally depict the relatively close proximity of the power electronics apparatus 116 to the CVMs 130, 132 and the transmission assembly 114 within the common housing 120. As noted above, the power electronics apparatus 116 may include transistor switches formed by materials such as silicon carbide (SiC) and gallium nitride (GaN), thereby enabling closer relative proximity and/or common cooling circuits with the CVMs 130, 132 and/or transmission assembly 114. The relatively close proximity enables shorter electrical connections and use of non-insulated cables. In one embodiment, relatively simple copper bars may be used to connect the CVMs 130, 132 and the power electronics apparatus 116. For example, the electrical connections may include phase power connections and voltage control connections.

As also depicted in FIGS. 6A and 6B is the configuration of the transmission assembly 114 within the housing 120 that enables a common lubrication and/or coolant sump 310 for the transmission components in which fluid (e.g., oil or coolant) may be collected and recirculated by the sump conduit 230 and filter 232.

Figure 7A:
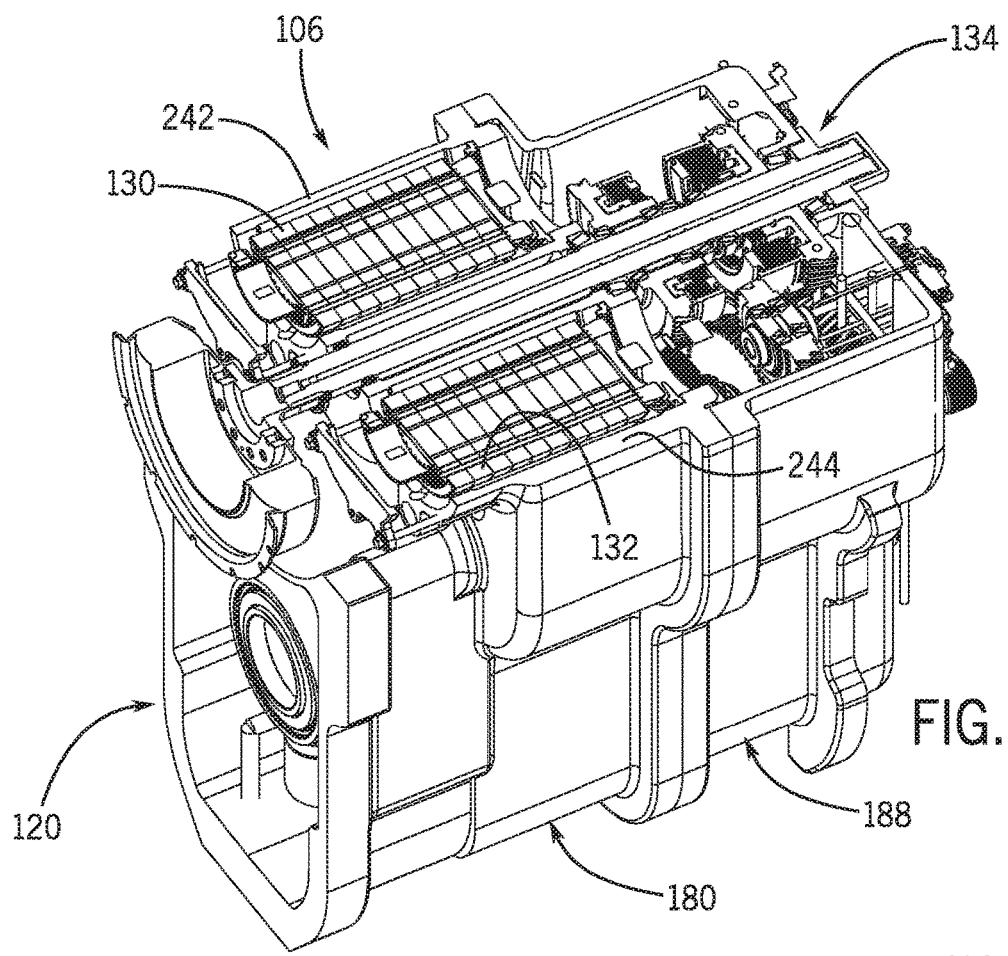
FIGS. 7A and 7B are cross-sectional views of the integrated transmission through line 7A-7A of FIG. 5A and line 7B-7B of FIG. 5B, respectively, according to an example embodiment of the present disclosure.
Figure 7B:
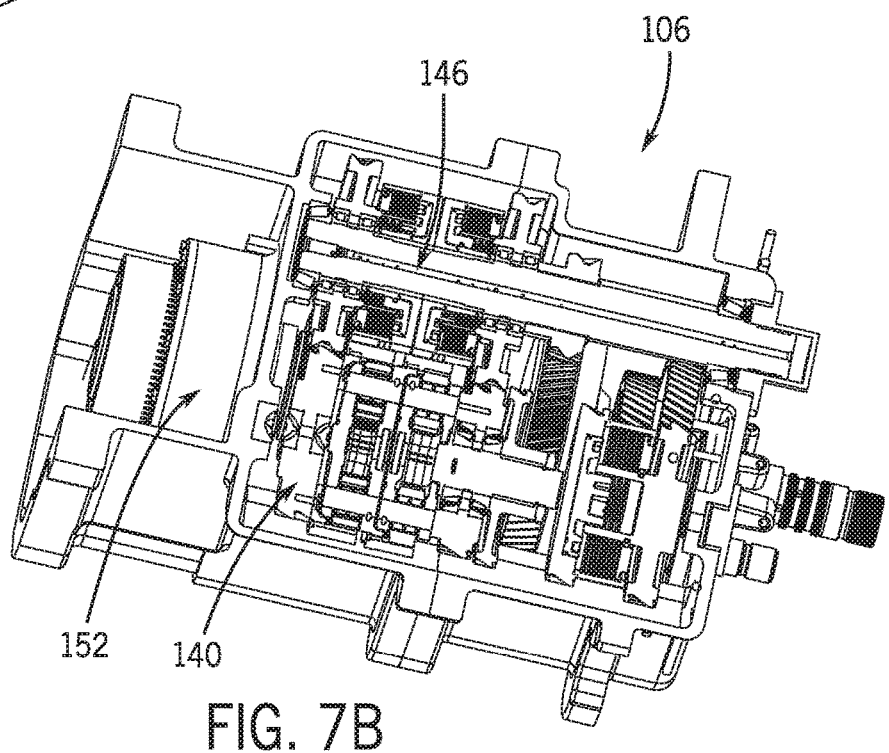

The views of FIGS. 7A and 7B are generally horizontal cross-sectional views of the transmission 106, as respectively referenced by line 7A-7A of FIG. 3A and line 7B-7B in FIG. 3B, and depict the interaction and relative arrangement of the CVP 112 and transmission assembly 114 within the housing 120 at different vertical positions. For example, FIG. 7A depicts a configuration of the input arrangement 134 and the CVMs 130, 132. As shown, the input shaft 136 extends in between the CVM cylinders 242, 244 that house the CVMs 130, 132. In particular, the input shaft 136, through the input shaft cylinder 290, is generally parallel to the longitudinal arrangement of the CVMs 130, 132 and CVM cylinders 242, 244. The CVM cylinders 242, 244, as formed integrally with the housing 120, provide a mechanism for restricting reaction forces, e.g., reaction forces as the second CVM 132 functions as a motor. The CVM cylinders 242, 244 additionally enable relatively thin or omitted machine housings of the CVMs 130, 132 since the CVM cylinders 242, 244 are arranged within the housing 120. The view of FIG. 7B particularly depicts the arrangement of the countershaft arrangement 146 and variator arrangement 140 of the transmission assembly 114 within the housing 120.

In one example, and as demonstrated by FIGS. 7A and 7B, the arrangement of the CVMs 130, 132 and the transmission assembly 114, as well as the power electronics apparatus 116, provide a relatively compact packaging within the common housing 120. In particular, the arrangement provides less "dead air" that may otherwise inhibit cooling effectiveness.

Additionally, the transmission 106 provide an arrangement within the housing 120 that does not require an excess of bolt or attachments of components. For example, the transmission 106 does not require bolts to mount the power electronics apparatus 116 because the power electronics apparatus 116 is arranged within the housing 120. Similarly, the CVMs 130, 132 are arranged within the housing 120, thereby avoiding the bolting of the CVMs to the housing as may otherwise be used in previous arrangements.

Figure 8A:
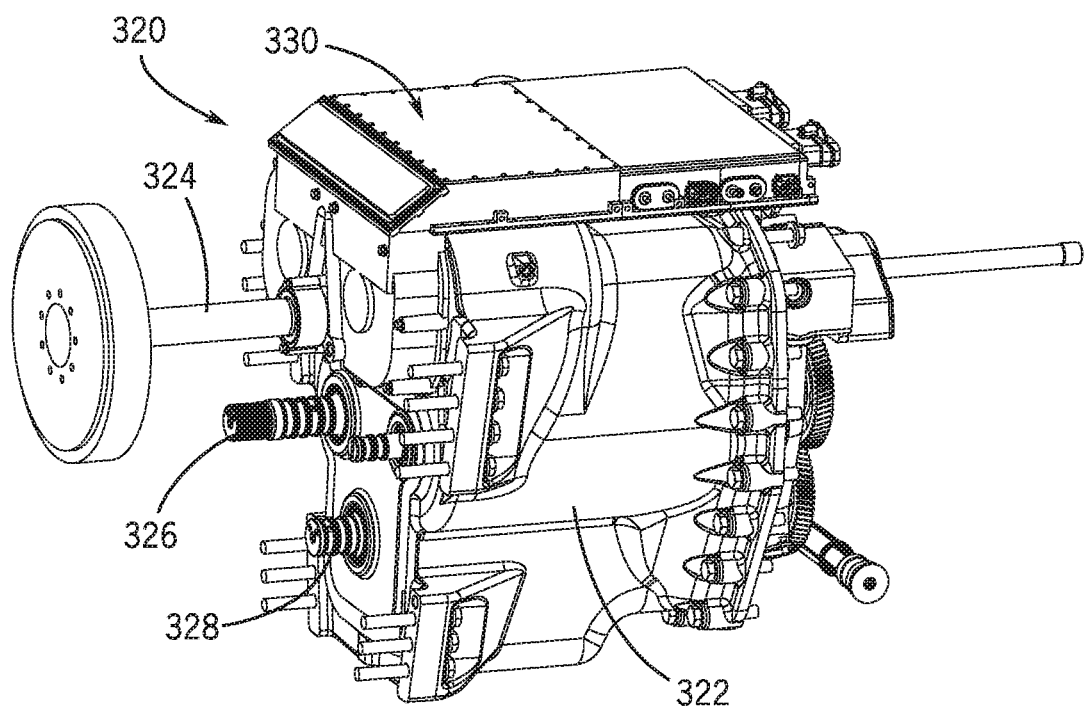
FIGS. 8A and 8B are isometric views of an integrated transmission according to a further example embodiment of the present disclosure.
Figure 8B:
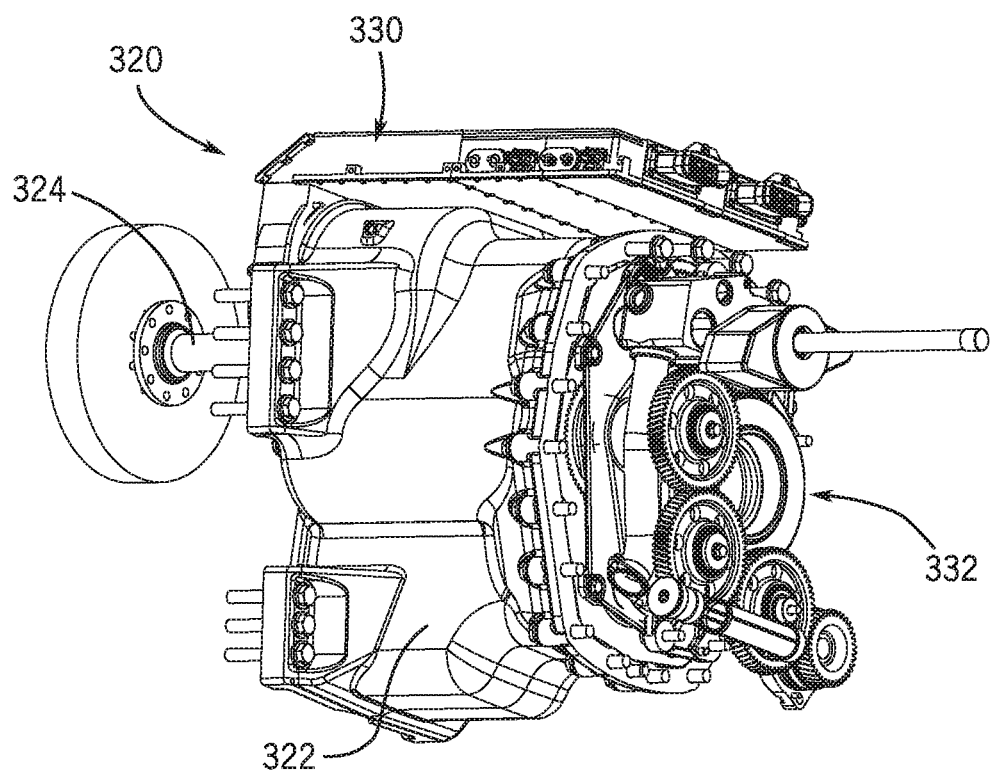

Generally, the integrated transmission described herein may take alternate forms than that depicted in FIGS. 1-7B. As a further example, FIGS. 8A and 8B depict views of another example embodiment of an integrated transmission 320. As in the transmission 106 discussed above, the transmission 320 includes a transmission assembly arranged within the housing 322 that includes any suitable power transfer arrangement, including an arrangement similar to the input arrangement 134, variator arrangement 140, countershaft arrangement 146, and output arrangement 152, such as described in reference to FIGS. 2-7B. The transmission 320 further includes one or more CVMs such as those described above. The views of FIGS. 8A and 8B particularly depicts an input shaft 324, output shaft 326, and PTO shaft 328. In this embodiment, a power electronics apparatus 330 is mounted to the top of the housing 322 rather than mounted within the housing 322, such as in the embodiment discussed above. Additionally, in this embodiment, a pump drive 332 is mounted to the aft portion of the housing 322 to drive hydraulic pressure to various systems of the vehicle (e.g., vehicle 100 of FIG. 1).

In further contrast to the example of FIGS. 1-7B, the housing 322 of the integrated transmission 320 of FIGS. 8A and 8B may be integrally formed from a single piece (e.g., a single casted piece), as opposed to the two shell portions 180, 188 described above. As such, the internal components of the transmission 320, including the transmission assembly and CVMs, may be inserted from the forward or aft sides of the housing 322 and secured within.

Accordingly, the powertrain described herein provides a transmission coupled to an engine and integrated with a CVP to operate in a plurality of modes to power an output arrangement with CVP power or engine power. The operator may select between these different modes and/or the transmission may automatically shift between these modes to maintain high operating efficiency in a number of different operating conditions. Also, the transmission may be constructed and arranged in a well-organized and compact manner that enables integration of the CVP within a common housing of the transmission. As such, the packaging and overall dimensions of the transmission and CVP may be smaller than comparable arrangements, while maintaining the ability to provide multiple forward and reverse modes.

In some examples, the transmission enables use of cartridge-style CVMs as discussed herein to provide an assembly that does not require a bolt flange between the CVM and transmission housing, thereby eliminating g-load vibration on the bolt flange and reduced tolerances. The powertrain further provides the ability to support the CVMs at only the front and rear within the common housing or by completely surrounding the CVMs with the common housing, as desired, as well as additional flexibility for cooling the CVMs and transmission components. Further, CVMs of the example transmission enable the electrical power of the power electronics apparatus to connect directly to the inverter and/or other electronic components rather than requiring a connection box and cables.

Also, the following examples are provided, which are numbered for easier reference.

1. An integrated transmission for a work vehicle powertrain having an engine delivering engine power to an input shaft, the integrated transmission comprising: a transmission housing having a first housing face through which the input shaft extends; a continuously variable power source (CVP) housed within the transmission housing and configured to generate CVP power; a transmission assembly comprising: an input arrangement contained within the transmission housing and having at least one input transmission component selectively coupling the engine power from the input shaft and the CVP power from the CVP; a variator arrangement contained within the transmission housing, the variator arrangement configured to receive the engine power and the CVP power through the input arrangement and to selectively transfer the engine power, transfer the CVP power, and transfer a summing of the engine power and the CVP power as variator output power; and a transmission gear arrangement contained within the transmission housing engaged with the variator arrangement and configured to provide a selective gear reduction for transmission of transmission output power from the variator output power to an output shaft that extends out of the transmission housing; and a power electronics apparatus arranged within or on the transmission housing and electrically coupled to the CVP.

2. The integrated transmission of example 1, wherein the transmission gear arrangement includes a countershaft arrangement and an output arrangement contained within the transmission housing and collectively configured to receive and transmit the variator output power from the variator arrangement with the selective gear reduction to the output shaft as the transmission output power.

3. The integrated transmission of example 2, wherein the transmission housing includes a first housing shell portion and a second housing shell portion that collectively form a primary housing section defined by at least one first housing shell portion primary wall and at least one second housing shell portion primary wall that houses the transmission assembly.

4. The integrated transmission of example 3, wherein the first housing shell portion and the second housing shell portion are configured to mate along a generally vertical plane.

5. The integrated transmission of example 3, wherein the first housing shell portion includes at least one CVP cylinder for housing the CVP.

6. The integrated transmission of example 5, wherein the CVP comprises a first continuously variable machine (CVM) configured to be driven by the engine power to operate as a generator to produce electric power and a second CVM configured to be driven by the electric power, via the power electronics apparatus, to operate as a motor to produce the CVP power to drive the transmission assembly.

7. The integrated transmission of example 6, wherein the at least one CVP cylinder includes a first CVM cylinder for housing the first CVM and a second CVM cylinder for housing the second CVM.

8. The integrated transmission of example 7, wherein the first housing shell portion includes a power electronics apparatus wall that at least partially defines an electronics housing section that houses the power electronics apparatus.

9. The integrated transmission of example 8, wherein the power electronics apparatus wall defines a first electronics coupling aperture such that a first electrical connection extends from the first CVM to the power electronics apparatus and a second electronics coupling aperture such that a second electrical connection extends from the second CVM to the power electronics apparatus.

10. The integrated transmission of example 8, wherein at least the first housing shell portion primary wall, the first CVM cylinder, the second CVM cylinder, and the power electronics apparatus wall are integrally formed.

11. The integrated transmission of example 8, wherein the first CVM cylinder extends between a first CVM external aperture on the first housing face of the first housing shell portion and a first CVM internal aperture, and the second CVM cylinder extends between a second CVM external aperture on the first housing face of the first housing shell portion and a second CVM internal aperture.

12. The integrated transmission of example 11, wherein the first housing shell portion includes an input shaft cylinder extending between a forward input aperture on the first housing face of the first housing shell portion and the primary housing section, and wherein the input shaft cylinder surrounds the input shaft through the first housing shell portion.

13. The integrated transmission of example 12, wherein the input shaft cylinder extends between the first CVM cylinder and the second CVM cylinder.

14. The integrated transmission of example 3, wherein the variator arrangement includes a variator shaft arranged within the transmission housing and the countershaft arrangement includes a countershaft arranged within the transmission housing, and wherein the first housing shell portion includes a forward internal variator support flange configured to support one end of the variator shaft and a forward internal countershaft support flange configured to support one end of the countershaft.

15. The integrated transmission of example 1, further comprising a sump arranged within the transmission housing to collect fluid passing across at least a portion of the CVP and the transmission assembly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. An integrated transmission for a work vehicle powertrain having an engine delivering engine power to an input shaft, the integrated transmission comprising:
a transmission housing having a first housing face through which the input shaft extends;
a continuously variable power source (CVP) housed within the transmission housing and configured to generate CVP power;
a transmission assembly comprising:
an input arrangement contained within the transmission housing and selectively coupling the engine power from the input shaft and the CVP power from the CVP;
a variator arrangement contained within the transmission housing, the variator arrangement configured to receive the engine power and the CVP power through the input arrangement and to selectively transfer the engine power, transfer the CVP power, and transfer a summing of the engine power and the CVP power as variator output power; and
a transmission gear arrangement contained within the transmission housing engaged with the variator arrangement and configured to provide a selective gear reduction for transmission of transmission output power from the variator output power to an output shaft that extends out of the transmission housing; and
a power electronics apparatus arranged within or on the transmission housing and electrically coupled to the CVP.

2. The integrated transmission of claim 1, wherein the transmission gear arrangement includes a countershaft arrangement and an output arrangement contained within the transmission housing and collectively configured to receive and transmit the variator output power from the variator arrangement with the selective gear reduction to the output shaft as the transmission output power.

3. The integrated transmission of claim 2, wherein the transmission housing includes a first housing shell portion and a second housing shell portion that collectively form a primary housing section that houses the transmission assembly.

4. The integrated transmission of claim 3, wherein the first housing shell portion and the second housing shell portion are configured to mate along a generally vertical plane.

5. The integrated transmission of claim 3, wherein the first housing shell portion includes a cylinder for housing the CVP.

6. The integrated transmission of claim 5, wherein the CVP comprises a first continuously variable machine (CVM) configured to be driven by the engine power to operate as a generator to produce electric power and a second CVM configured to be driven by the electric power, via the power electronics apparatus, to operate as a motor to produce the CVP power to drive the transmission assembly.

7. The integrated transmission of claim 6, wherein the cylinder is a first CVM cylinder for housing the first CVM and further including a second CVM cylinder for housing the second CVM.

8. The integrated transmission of claim 7, wherein the first housing shell portion at least partially defines an electronics housing section that houses the power electronics apparatus.

9. The integrated transmission of claim 8, wherein the first housing shell portion defines a first electronics coupling aperture such that a first electrical connection extends from the first CVM to the power electronics apparatus and a second electronics coupling aperture such that a second electrical connection extends from the second CVM to the power electronics apparatus.

10. The integrated transmission of claim 8, wherein the first housing shell portion defines the first CVM cylinder, the second CVM cylinder, and the electronics housing section.

11. The integrated transmission of claim 8, wherein the first CVM cylinder extends between a first CVM external aperture on the first housing face of the first housing shell portion and a first CVM internal aperture, and the second CVM cylinder extends between a second CVM external aperture on the first housing face of the first housing shell portion and a second CVM internal aperture.

12. The integrated transmission of claim 11, wherein the first housing shell portion includes an input shaft cylinder extending between a forward input aperture on the first housing face of the first housing shell portion and the primary housing section, and wherein the input shaft cylinder surrounds the input shaft through the first housing shell portion.

13. The integrated transmission of claim 12, wherein the input shaft cylinder extends between the first CVM cylinder and the second CVM cylinder.

14. The integrated transmission of claim 3,
wherein the variator arrangement includes a variator shaft arranged within the transmission housing and the countershaft arrangement includes a countershaft arranged within the transmission housing, and
wherein the first housing shell portion includes a forward internal variator support flange configured to support one end of the variator shaft and a forward internal countershaft support flange configured to support one end of the countershaft.

15. The integrated transmission of claim 1, further comprising a sump arranged within the transmission housing to collect fluid passing across at least a portion of the CVP and the transmission assembly.

16. The integrated transmission of claim 1, further comprising a pump drive mounted to the transmission housing, the pump drive configured to be driven by the transmission assembly and to circulate a fluid through the integrated transmission.

17. The integrated transmission of claim 1, wherein the transmission housing that houses at least the CVP and the transmission assembly is integrally formed.

18. An integrated transmission housing for a transmission with a continuously variable power source (CVP) configured to generate CVP power and a transmission assembly that receives engine power via an input shaft, the integrated transmission housing comprising:
a first housing shell portion with a first face, a first side wall, and a first shell portion flange circumscribing the first side wall;
a cylinder arranged within the first housing shell portion configured to house the CVP; and
a second housing shell portion with a second face, a second side wall, and a second shell portion flange circumscribing the second side wall,
wherein the first shell portion flange and the second shell portion flange are mated together such that at least a portion of the first face, the first side wall, the second face, and the second side wall collectively form a primary housing section configured to house the transmission assembly with an input arrangement selectively coupling the engine power from the input shaft and the CVP power from the CVP, a variator arrangement configured to receive the engine power and the CVP power through the input arrangement and to selectively transfer the engine power, transfer the CVP power, and transfer a summing of the engine power and the CVP power as variator output power, and a transmission gear arrangement engaged with the variator arrangement and configured to provide a selective gear reduction for transmission of transmission output power from the variator output power to an output shaft that extends out of the integrated transmission housing.

19. The integrated transmission housing of claim 18, wherein the cylinder is a first CVM cylinder within the first housing shell portion for housing a first CVM of the CVP and further including a second CVM cylinder within the first housing shell portion for housing a second CVM of the CVP.

20. The integrated transmission housing of claim 18, wherein the first housing shell portion that at least partially defines an electronics housing section that houses a power electronics apparatus.

* * * * *